UNITED STATES PATENT OFFICE.

CARL GRÜNZWEIG AND PAUL HARTMANN, OF LUDWIGSHAFEN, GERMANY.

HEAT-INSULATING COMPOUND.

SPECIFICATION forming part of Letters Patent No. 309,943, dated December 30, 1884.

Application filed July 15, 1884. (Specimens.)

*To all whom it may concern:*

Be it known that we, CARL GRÜNZWEIG and PAUL HARTMANN, both citizens of Germany, and residing at Ludwigshafen-on-the-Rhine, Germany, have invented new and useful Improvements in Heat-Insulating Compounds, of which the following is a specification.

It is the object of our invention to supply disintegrated cork, obtained as waste from cork-factories, and which is a very suitable material for a protecting composition, it being light, elastic, constant, and cheap, and a very poor conductor of heat, in a form in which it could be easily painted or coated onto the objects to be protected, and which should retain in a high degree the properties of cork. A small specific gravity may be taken as indicating small power of heat conductivity.

Hitherto we have not succeeded in producing a durable article of less than 0.45° specific gravity with cork, fossil-meal, and hair.

Many of the protecting compositions in the market, which are composed principally of fossil-meal and hair, have a specific gravity of 0.6°, and form an earthy mass interwoven with hairs. Some compositions are even heavier, and consist chiefly of lime or cement. All these compositions have the additional disadvantages of having too little elasticity, and of giving off dust in the sacks when not sent as a paste or when the covering is taken off, and, on the other hand, when in the form of a paste the decomposition of the animal fiber is apt to develop a bad smell. In consequence of the heat radiated from the covered object, the fibrous materials break and the covering is no longer firmly attached to the object. Also, the coating, when taken off, cannot be used again by mixing with water, in consequence of the fibrous materials being broken, and in compositions having hydraulic properties a chemical change takes place. We avoid all these disadvantages in our new composition, which is constituted as follows: Asbestus fiber, after having been well loosened, is mixed, by use of any suitable liquid, with finely-ground fossil-meal to which has been added a small proportion of clay and soluble glass. These materials have great affinity for one another, and the asbestus fiber entirely absorbs the fossil-meal, and thus obtains more body without losing its felting or binding properties, and the composition acquires the property of being able, when mixed with water, to be coated over as a paste. The fossil-meal loses its original dusty properties, and does not appear as a distinct ingredient in the dried composition.

The fossil-meal in our present composition does not constitute the binding material for the cork, as has been the case in our former compositions; but we bind the cork with the asbestus fiber prepared as described. It is preferable to use the cork in grains of about two millimeters, and entirely free from dust, because this size requires proportionally the least asbestus to bind. Smaller grains or particles require more binding material. The cork is easily mixed by wet process with the asbestus fiber combined with the fossil-meal, which uniformly and firmly intimately binds and felts it. Other fibers—such as cow-hair, silk, cotton-wool, and wool—cannot be so uniformly distributed; nor do they possess the property of felting or binding such coarse-grained material. The cork will be so intimately bound by the asbestus fiber that the composition can be mixed to a thin paste without the cork being washed out.

We use the following proportions by volume: One hundred and fifty parts disintegrated cork, forty parts loosened asbestus fiber, one hundred and fifty parts ground fossil-meal, three parts clay, two parts solution of soluble glass. This mixture is quickly dried at a temperature of above 100° centigrade, in order that the felting or binding properties may not be too strong when in the form of a paste, which would render its solution in water for reduction to a paste to coat the objects to be protected a matter of difficulty. The dried cakes are then disintegrated for convenient transport, and filled into sacks. When the composition is to be applied, it is mixed with water and painted or coated onto the hot objects to be covered, where it dries and becomes a light and elastic covering with a hard crust. This crust is chiefly obtained by the solution of soluble glass and clay. The specific gravity is 0.36°. As the composition contains a large amount of cork in proportion to the other materials, it is, apart from the advantages of small specific gravity, very cheap as regards surface covering and thickness of material, because disintegrated cork from the waste of cork-stopper manufactories is by far the cheapest (as regards volume) of all the constituents. It is an improvement, also, in this respect on our former compositions.

Having thus described our invention and the manner of employing the same, we claim—

The herein-described non-conducting composition, consisting of asbestus, fossil-meal, clay, soluble glass, disintegrated cork, and water, in about the proportions set forth.

In testimony whereof we have signed our names to this specification in the presence of two subscribing witnesses.

CARL GRÜNZWEIG.
PAUL HARTMANN.

Witnesses for Carl Grünzweig:
HCH. RAPPENEGGER.
C. WÜLLENBÜCHER.

Witnesses for Paul Hartmann:
CARL GANZHON.
E. LANGEN.